United States Patent
Vishnoi et al.

(10) Patent No.: US 12,249,314 B2
(45) Date of Patent: Mar. 11, 2025

(54) ROUTING FOR CHATBOTS

(71) Applicant: Oracle International Corporation, Redwood Shores, CA (US)

(72) Inventors: Vishal Vishnoi, Redwood City, CA (US); Xin Xu, San Jose, CA (US); Srinivasa Phani Kumar Gadde, Belmont, CA (US); Fen Wang, Redwood City, CA (US); Muruganantham Chinnananchi, Cupertino, CA (US); Manish Parekh, San Jose, CA (US); Stephen Andrew McRitchie, Palo Alto, CA (US); Jae Min John, Redwood City, CA (US); Crystal C. Pan, Palo Alto, CA (US); Gautam Singaraju, Dublin, CA (US); Saba Amsalu Teserra, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 18/136,745

(22) Filed: Apr. 19, 2023

(65) Prior Publication Data
US 2023/0252975 A1    Aug. 10, 2023

Related U.S. Application Data

(63) Continuation of application No. 16/857,047, filed on Apr. 23, 2020, now Pat. No. 11,657,797.
(Continued)

(51) Int. Cl.
G06F 17/00 (2019.01)
G06N 5/04 (2023.01)
(Continued)

(52) U.S. Cl.
CPC ........... *G10L 13/08* (2013.01); *G06N 5/04* (2013.01); *G06N 20/00* (2019.01)

(58) Field of Classification Search
CPC .......... G10L 13/08; G06N 5/04; G06N 20/00
(Continued)

(56) References Cited

U.S. PATENT DOCUMENTS 8,903,716 B2    12/2014    Chen et al.
9,514,748 B2    12/2016    Reddy et al.
(Continued)

OTHER PUBLICATIONS

U.S. Appl. No. 16/857,047, "Advisory Action", filed Feb. 23, 2023, 6 pages.
(Continued)

*Primary Examiner* — Paul C McCord
(74) *Attorney, Agent, or Firm* — Kilpatrick Townsend & Stockton LLP

(57) ABSTRACT

Techniques are described for invoking and switching between chatbots of a chatbot system. In some embodiments, the chatbot system is capable of routing an utterance received while a user is already interacting with a first chatbot in the chatbot system. For instance, the chatbot system may identify a second chatbot based on determining that (i) such an utterance is an invalid input to the first chatbot or (ii) that the first chatbot is attempting to route the utterance to a destination associated with the first chatbot. Identifying the second chatbot can involve computing, using a predictive model, separate confidence scores for the first chatbot and the second chatbot, and then determining that a confidence score for the second chatbot satisfies one or more confidence score thresholds. The utterance is then routed to the second chatbot based on the identifying of the second chatbot.

20 Claims, 8 Drawing Sheets

Related U.S. Application Data

(60) Provisional application No. 62/839,580, filed on Apr. 26, 2019.

(51) Int. Cl.
  *G06N 20/00* (2019.01)
  *G10L 13/08* (2013.01)

(58) Field of Classification Search
  USPC .......................................................... 704/260
  See application file for complete search history.

(56) References Cited

U.S. PATENT DOCUMENTS

| | | | |
|---|---|---|---|
| 10,853,717 | B2 | 12/2020 | Abramson et al. |
| 10,991,373 | B1* | 4/2021 | Wang ...................... G06F 21/52 |
| 2015/0324882 | A1 | 11/2015 | Ouimet |
| 2017/0180284 | A1 | 6/2017 | Smullen et al. |
| 2018/0225365 | A1 | 8/2018 | Altaf et al. |
| 2019/0036856 | A1* | 1/2019 | Bergenlid ................ H04N 7/15 |
| 2019/0065465 | A1 | 2/2019 | Cristian et al. |
| 2019/0132451 | A1 | 5/2019 | Kannan |
| 2019/0140986 | A1* | 5/2019 | Anderson ............. G06F 40/279 |
| 2019/0266287 | A1* | 8/2019 | Chen ................... G06F 16/3329 |
| 2019/0325081 | A1 | 10/2019 | Liu et al. |
| 2019/0370629 | A1 | 12/2019 | Liu et al. |
| 2020/0019373 | A1* | 1/2020 | Abramson ............. G06F 9/453 |
| 2020/0125919 | A1 | 4/2020 | Liu et al. |
| 2020/0150937 | A1* | 5/2020 | Smith ...................... G06N 3/02 |
| 2020/0310749 | A1* | 10/2020 | Miller ..................... G06F 3/167 |
| 2021/0043208 | A1 | 2/2021 | Luan et al. |
| 2021/0150150 | A1 | 5/2021 | Wu |
| 2021/0350084 | A1* | 11/2021 | Zhang .................... G06F 40/30 |

OTHER PUBLICATIONS

U.S. Appl. No. 16/857,047, "Final Office Action", filed Nov. 7, 2022, 16 pages.

U.S. Appl. No. 16/857,047, "First Action Interview Office Action Summary", filed Jun. 3, 2022, 6 pages.

U.S. Appl. No. 16/857,047, "First Action Interview Pilot Program Pre-Interview Communication", filed Apr. 27, 2022, 6 pages.

U.S. Appl. No. 16/857,047, "Notice of Allowance", filed Mar. 29, 2023, 7 pages.

\* cited by examiner

ROUTING FOR CHATBOTS

CROSS-REFERENCES TO RELATED APPLICATIONS

This application is a continuation of U.S. patent application Ser. No. 16/857,047, filed Apr. 23, 2020, which claims priority to U.S. Provisional Application No. 62/839,580, filed on Apr. 26, 2019, the entire disclosures of which are herein incorporated by reference in their entireties for all purposes.

BACKGROUND

Chatbots provide an interface for conversations with human users. Chatbots can be configured to perform various tasks in response to user input provided during a conversation. The user input can be supplied in various forms including, for example, audio input and text input. Thus, natural language understanding (NLU), speech-to-text, and other linguistic processing techniques may be employed as part of the processing performed by a chatbot. In some computing environments, multiple chatbots are available for conversing with a user, with each chatbot handling a different set of tasks.

One of the challenges to implementing a chatbot system is determining when to permit a chatbot to handle a particular piece of user input (e.g., a text utterance). In a system with multiple chatbots, a user may wish to interact with different chatbots at different times, including switching to another chatbot while the user is engaged in a conversation with a particular chatbot. It is therefore desirable to be able to route user input to chatbots in an intelligent manner, so that the user input is sent to the chatbot that the user intends to interact with.

SUMMARY

The present disclosure relates to chatbot systems, and more particularly, to improved techniques for routing user input to one or more chatbots in a chatbot system. More particularly, techniques are described for invoking and switching between chatbots in connection with conversations with a user. Various embodiments are described herein, including methods, systems, non-transitory computer-readable storage media storing programs, code, or instructions executable by one or more processors, and the like.

In certain embodiments, a chatbot system includes a master bot configured to route user input to one or more chatbots (referred to herein as "bots," "skill bots," or "skills"). The master bot can evaluate user input and direct or redirect the user to an appropriate bot by selecting, based on the evaluation of the user input, a bot to invoke. To determine which bot to route the user input to, the master bot may identify candidate bots based on confidence scores computed using a predictive model. A list of candidate bots can be refined, for example, by eliminating from consideration any bot whose confidence score indicates, by virtue of failing to satisfy a confidence threshold, that the bot is unlikely to be able to handle the input. The determining of which bot to route to can involve applying multiple types of thresholds to the confidence scores.

Routing can be performed in a context aware manner so that the degree of consideration given to a particular bot depends on the identity or the behavior of a bot that the user is currently interacting with. For example, in certain embodiments, a method performed by a computer-implemented chatbot system involves determining that (i) an utterance received from a user while the user is interacting with a first chatbot of the chatbot system is an invalid input to the first chatbot or (ii) that the first chatbot is attempting to route the utterance to a destination associated with the first chatbot. The method further involves, responsive to the determining that the utterance is an invalid input to the first chatbot or that the first chatbot is attempting to route the utterance to a destination associated with the first chatbot, identifying a second chatbot for generating a response to the utterance. Identifying the second chatbot can include computing, using a predictive model, a confidence score for the first chatbot and a confidence score for the second chatbot, the confidence score for the first chatbot indicating a likelihood of the utterance being representative of a task that the first chatbot is configured to perform, and the confidence score for the second chatbot indicating a likelihood of the utterance being representative of a task that the second chatbot is configured to perform. Identifying the second chatbot can further include determining that the confidence score for the second chatbot satisfies one or more confidence score thresholds. The utterance is then routed to the second chatbot based on the identifying of the second chatbot.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to chatbot systems, and more particularly, to improved techniques for routing user input to one or more chatbots in a chatbot system. More particularly, techniques are described for invoking and switching between chatbots in connection with conversations with a user.

Chatbot System Overview (Example)

Figure 1:
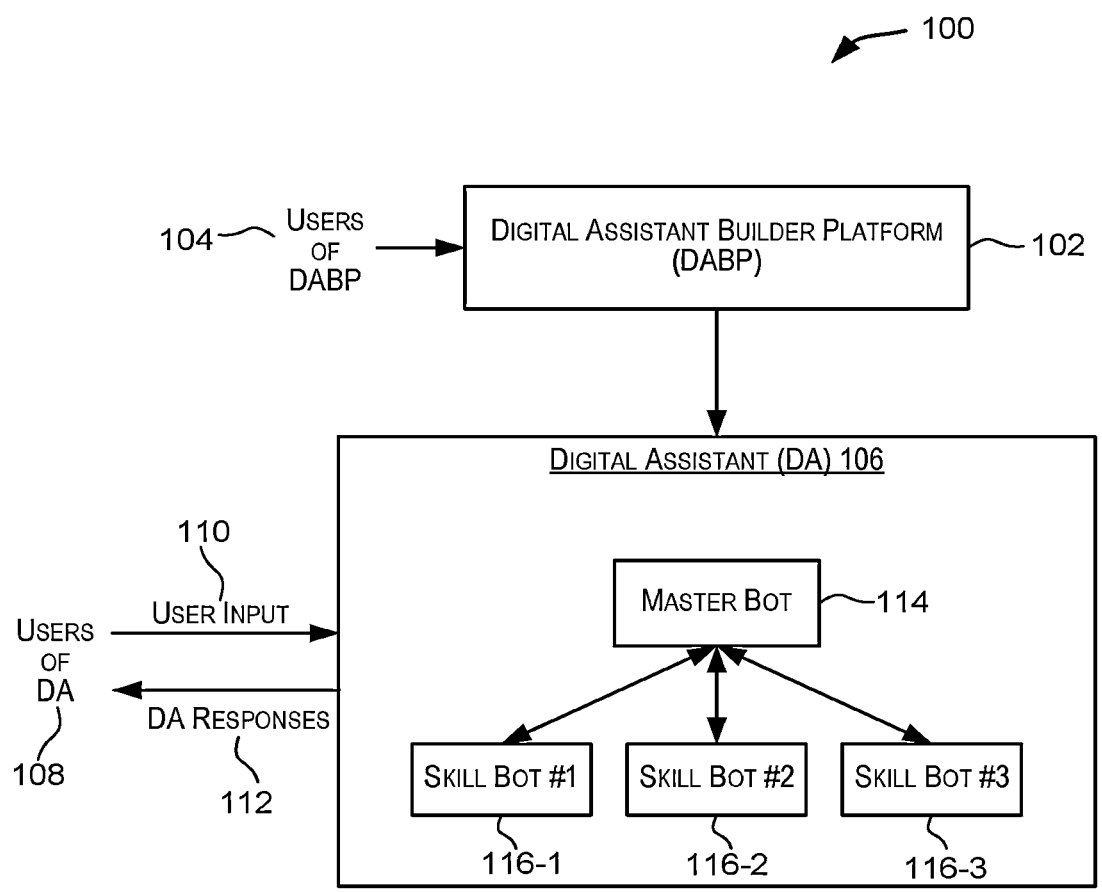
FIG. 1 is a simplified block diagram of an environment incorporating a chatbot system according to certain embodiments.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides the text as input to digital assistant 106. In some embodiments, a user utterance 110 can be in audio input or speech form, such as when a user says or speaks something that is provided as input to digital assistant 106. The utterances are typically in a language spoken by the user 108. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (using NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using natural language generation (NLG) techniques. Thus, the natural language processing (NLP) performed by a digital assistant can include a combination of NLU and NLG processing.

The NLU processing performed by a digital assistant, such as digital assistant 106, can include various NLU related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications (e.g., an instant messaging application), and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or provided using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102, e.g., through a user interface provided by DABP 102 for registering the skill bot with the digital assistant. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child(or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistant developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 can provide a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 creates a skill bot from scratch using tools and services offered by DABP 102.

In certain embodiments, at a high level, creating or customizing a skill bot involves the following steps:
(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names, which serve as identifiers for the skill bot, can then be used by users of a digital assistant to explicitly invoke the skill bot. For example, a user can include an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance. In some instances, input utterances are provided to an intent analysis engine (e.g., a rules-based or machine-learning based classifier executed by the skill bot), which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities can be added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances, parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. Q&A intents are created in a similar manner as regular intents. The dialog flow for Q&A intents can be different from that for regular intents. For example, unlike regular intents, the dialog flow for a Q&A intent may not involve prompts for soliciting additional information (e.g., the value for a particular entity) from the user.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, and how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:

(a) a context section
(b) a default transitions section
(c) a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states section. For example, there might be times when it is desirable to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, the states section in the dialog flow definition of the first skill can be configured to initiate an interaction with the second different skill in the same digital assistant and then return to the original dialog flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the Exit and Help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as an explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (using the trained model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Routing Behavior

Figure 2:
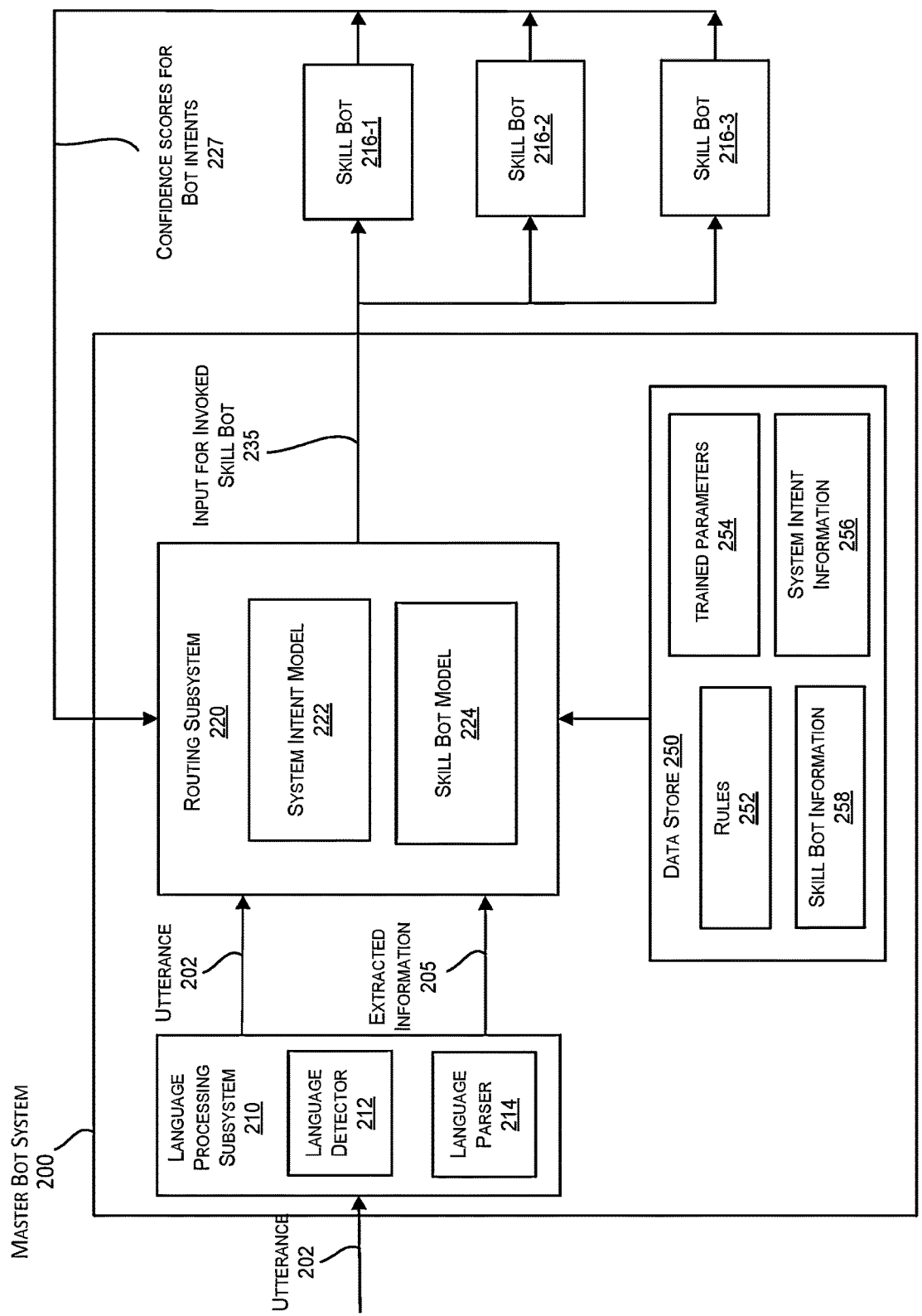
FIG. 2 is a simplified block diagram of a master bot system according to certain embodiments.

FIG. 2 is a simplified block diagram of a master bot (MB) system 200 according to certain embodiments. MB system 200 may correspond to the master bot 114 in FIG. 1 and can be implemented in software only, hardware only, or a combination of hardware and software. As indicated above, a master bot can be implemented by a digital assistant/chatbot system. Therefore, the master bot functionality described below with respect to the MB system 200 or other master bot embodiments can be provided as part of the processing performed by a digital assistant.

As shown in FIG. 2, the MB system 200 includes a language processing subsystem 210 and a routing subsystem 220. The language processing subsystem 210 is configured to process an utterance 202 provided by a user. As discussed in the Chatbot System Overview section above, such processing can involve NLU processing performed to understand the meaning of an utterance. Accordingly, the language processing subsystem 210 may include a language detector 212 configured to detect the language of the utterance 202 and a language parser 214 configured to parse utterance 202 to understand its meaning. The processing performed by the language processing subsystem 210 can include, for example, sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). The language processing subsystem 210 outputs the utterance 202 together with extracted information 205 generated as a result of the above noted processing. For example, the extracted information 205 may include a dependency tree, a list of part-of-speech tags, and so on. In some embodiments, the language processing subsystem 210 may reformat the utterance 202 for input to the routing subsystem 220. Reformatting may involve, for example, rearranging the order of words in the utterance 202, splitting the utterance 202 into different parts for separate processing of each part, correcting grammatical errors, and the like.

Routing subsystem 220 is configured to determine which bot (e.g., one of a set of available skill bots 216-1 to 216-3 or the MB system 200 itself) should handle the utterance 202. For example, as discussed earlier, a master bot can be configured with one or more system intents (Exit, Help, UnresolvedIntent, etc.). The system intents are master bot or digital assistant level intents associated with tasks that are not specific to any particular skill bot. For example, the Exit intent may have a dialog flow associated with it that prompts the user for input confirming the user's desire to exit a current conversation with a particular skill bot. Similarly, the Help intent may have a dialog flow associated with it that guides the user through a series of questions and answers designed to provide the user with help about using the digital assistant or interacting with skill bots in general.

The dialog flow definition for a bot (master or child/skill) can include a reference to at least one intent configured for the bot. In some embodiments, such references are specified as actions associated with an intent state, where the intent state is one of the states defined in the states section of the dialog flow definition. For example, the intent state for a pizza ordering bot may include a reference to a component configured to infer the intents for the pizza ordering bot (e.g. a built-in "System. Intent" component that executes an intent model 320 configured for the pizza ordering bot), a list of properties for the intent state (e.g., one or more variables), and a transitions section including a separate action for each intent of the bot. Each intent of a bot can have an associated dialog flow. The example intent state shown below includes transitions to three different intents (OrderPizza, CancelPizza, UnresolvedIntent) associated with a pizza ordering bot, where each transition brings the dialog flow to a particular state (resolvesize, cancelorder, unresolved).

Intent:
  Component: "System. Intent"
  Properties:
    variable: "iResult"
  Transitions:
    Actions:
      OrderPizza: "resolvesize"
      CancelPizza: "cancelorder"
      UnresolvedIntent: "unresolved"

To determine whether the utterance 202 should be handled by a particular system intent, the routing subsystem 220 can apply a system intent model 222. Similarly, the routing subsystem 220 can apply a skill bot model 224 (also referred to as a candidate skills model) to determine whether the utterance 202 should be handled by a particular skill bot (e.g., 216-1, 216-2, or 216-3). In some embodiments, the models 222 and 224 are combined into a single model. Each of the models 222, 224 can be implemented as a rules-based and/or AI-based model. For instance, the models 222, 224 can be implemented as neural networks trained to infer which system intent or skill bot is most suited for responding to the utterance 202. Accordingly, the routing subsystem 220 can make a routing decision based on one or more rules 252 configured for the master bot and/or for a particular skill bot. Alternatively or additionally, the routing decision can be based on trained parameters (e.g., weight value and bias values) resulting from prior training of the models 222, 224 on training data.

As shown in FIG. 2, the rules 252 and trained parameters 254 can be stored in a data store 250 accessible to the MB system 200. The data store 250 can also store system intent information 256 and skill bot information 258. The system intent information 256 can include information about the capabilities of the MB system 200 with respect to system intents, training data for the system intent model 222 (e.g., example utterances representative of system intents), and/or configuration information for the system intents. For instance, the system intent information 256 can include dialog flow information for each system intent and values for confidence thresholds specific to system intents. Similarly, the skill bot information 258 can include information about the capabilities of the skill bots 216, training data for the skill bot model 224, and/or configuration information for the skill bots 216.

The input to the models 222, 224 can include the utterance 202 itself and/or information derived from the utterance 202, e.g., the extracted information 205. For instance, when implemented as neural networks, each of the models 222, 224 can receive an encoded version of the utterance 202 for processing (e.g., a set of word embeddings containing a separate embedding for each word in the utterance 202, where each embedding is a multi-dimensional feature vector containing values for features of a corresponding word). Each model 222, 224 may be configured to infer a class or category based on the input to the model, where the class/category represents a particular system intent or skill bot. Training data can include example utterances and, for each example utterance, a label (ground truth) indicating which system intent or skill bot should be used to handle the example utterance. The models 222, 224 can be trained by comparing the outputs generated based on the example utterances to their corresponding labels, and then adjusting parameters of the models 222, 224 (e.g., a weight and/or bias value employed in an activation function of a node in a neural network) when there is a difference between the inference and the label. For instance, the training may involve backpropagation to minimize a loss function.

When implemented as rules-based models, the models 222, 224 may employ rules 252 that are configured for determining whether the utterance 202 is a match to a particular system intent or skill bot. For example, the rules 252 may include, for each system intent or skill bot, a corresponding regular expression (regex) that defines a search pattern for an utterance. For instance, a regex for a pizza ordering bot may specify that, in order for an utterance to match to the pizza ordering bot, the utterance must contain the word "pizza" in combination with at least one word among a set of synonyms for placing an order (e.g., "order," "buy," "purchase," etc.)

As indicated above, the routing performed by a digital assistant may involve the digital assistant computing, in the absence of an explicit invocation, confidence scores for the system intents and the skill bots associated with the digital assistant. Thus, the routing subsystem 220 may process the utterance 202 by first determining whether the utterance 202 contains an invocation name of a system intent or skill bot. The invocation names can be stored as part of the system intent information 256 and the skill bot information 258. If the utterance 202 includes an invocation name, the routing subsystem 220 will invoke the corresponding system intent or skill bot and provide at least part of the utterance 202 (e.g., the utterance 202 with the invocation name removed) as input to the system intent or skill bot.

If the utterance 202 does not include an invocation name, then the routing subsystem 220 can apply the system intent model 222 to compute a separate confidence score (e.g., a value between 0% and 100%) for each system intent associated with the digital assistant. For example, each system intent may be associated with a corresponding node in an output layer of a neural network implementing the system intent model 222, where the node in the output layer is configured to compute a confidence score whose value indicates the likelihood that the utterance 202 can be handled by the system intent. Similarly, the routing subsystem 220 can apply the skill bot model 224 to compute a separate confidence score for each skill bot associated with the digital assistant, the confidence score indicating the likelihood that the utterance 202 can be handled by the skill bot.

In addition to considering confidence scores for system intents and confidence scores for skill bots, the routing subsystem 220 may further base its routing decision upon confidence scores for intents associated with one or more of the skill bots 216, i.e., bot intents. In some embodiments, the system intent model 222 is configured to compute confidence scores for each system intent associated with the digital assistant, the skill bot model 224 is configured to compute confidence scores for each skill bot associated with the digital assistant, and each skill bot 216 is configured to compute a separate confidence score for each of its configured intents. Thus, the routing subsystem 220 may receive confidence scores 227 computed by the skill bots 216 for intents associated with the skill bots 216. In other embodiments, all three types of confidence scores are computed at the digital assistant or master bot level.

To determine whether to route the utterance 202 to any system intent, the routing subsystem 220 may be configured to apply one or more confidence thresholds. If the confidence score for a system intent satisfies the one or more confidence thresholds, then the system intent is deemed a match for the utterance 202 and the routing subsystem 220 will cause the utterance 202 to be handled using a dialog flow configured for the matching system intent. If no system intent has a confidence score that satisfies the confidence threshold(s), then the routing subsystem 220 may proceed with evaluating skill scores and, optionally, bot intent scores (e.g., the confidence scores 227).

As with the system intents, the routing subsystem 220 may apply one or more confidence thresholds to the skill scores to determine which skill bot 216 is a match for the utterance 202. Further, the routing subsystem 220 may apply one or more confidence thresholds to the bot intent scores to determine which bot intent is a match for the utterance 202. In some embodiments, the routing subsystem 220 may simply forward the utterance 202 to the matching skill bot 216 and the matching skill bot 216 will decide which bot intent to use for generating a response to the utterance 202. Thus, confidence thresholds for bot intent scores can be applied during local processing within a skill bot. Alternatively, in other embodiments, the routing subsystem 220 may, based on evaluating the bot intent scores 227, decide which bot intent to use for the utterance 202.

Evaluating both skill scores and bot intent scores improves the accuracy of the matching for the utterance 202. Depending on the way the utterance 202 is worded, it may be possible for a skill score to not meet confidence score criteria (one or more confidence thresholds) and yet the bot intent score for one of the intents with which the skill is configured could meet confidence score criteria. Similarly, none of the bot intent scores for a particular skill may meet confidence score criteria, but the skill score for the particular skill could meet confidence score criteria. Taking both skill scores and bot intent scores into consideration during routing reduces the likelihood that the utterance 202 is routed to a skill or bot intent that is incapable of handling the utterance 202.

Confidence thresholds for skills or bot intents are not necessarily the same as confidence thresholds for system intents. For example, a different confidence threshold value can be used for skills than for system intents. Similarly, confidence thresholds may differ between skills and bot intents. In some embodiments, confidence thresholds for skills and/or bot intents are configurable on a per-skill basis.

For example, in the embodiment of FIG. 2, a confidence threshold used to determine whether the skill bot 216-1 is a match for an utterance could be set to a different value than a confidence threshold used to determine whether the skill bot 216-2 is a match for an utterance.

Examples of different types of confidence thresholds that can be applied by the routing subsystem 220 include:

Confidence Threshold—Applicable to system intents, skills, and bot intents. This is the minimum score required for a system intent/skill/bot intent to be deemed a candidate (i.e., a potential match) for an input utterance, e.g., 0.4 or 40%. Anything scoring below this threshold is automatically eliminated from further consideration.

Confidence Win Margin—Applicable to system intents, skills, and bot intents. This is the maximum allowable difference between the highest score and any other score in order for the other scores to remain under consideration (assuming there is at least one other score that meets or exceeds the Confidence Threshold). In other words, if the highest score exceeds the next highest score by more than the Confidence Win Margin, then only the highest score will be considered even if the next highest score meets or exceeds the Confidence Threshold. For example, if the Confidence Win Margin is set to 0.1 and the highest score is 0.6, then any candidates whose scores are between 0.5 and 0.6 will also be considered (assuming that the Confidence Threshold is 0.5 or less). Therefore, when the Confidence Win Margin is not satisfied, multiple candidates could be deemed to be matching and this may trigger further evaluation by the digital assistant and/or disambiguation processing (e.g., prompting the user for additional input confirming which candidate the user wishes to invoke).

Consider All Threshold—Applicable to system intents, skills, and bot intents. This is the minimum required score for all matching candidates to be considered. For example, if the Consider All Threshold is set to 0.7 and the two highest scores are 0.71 and 0.9, then both scores will be kept under consideration. The Consider All Threshold is typically set to a higher value than the Confidence Threshold and takes precedence over the Confidence Win Margin. Thus, even if the score of 0.9 satisfies the Confidence Win Margin with respect to the score of 0.71, the intents or skills associated with both scores will be kept under consideration. Therefore, this is a threshold value that, when met or exceeded by a confidence score computed for a chatbot, renders the chatbot eligible to be considered for use in generating a response to an utterance irrespective of a confidence score computed for any other chatbot. As with failure to satisfy the Confidence Win Margin, when there are multiple scores that satisfy the Consider All Threshold, this may trigger further evaluation by the digital assistant and/or disambiguation processing (e.g., prompting the user for additional input confirming which candidate the user wishes to invoke).

Consider Only Current Context Threshold—Applicable to skills and bot intents. The current context is the bot that the user is currently interacting (e.g., having a conversation) with. For instance, the current context could be the master bot/digital assistant. The current context could also be a particular skill. If any confidence score computed for a particular skill that the user is currently interacting with (including scores for bot intents associated with the particular skill) is at least equal to this threshold, then only this particular skill will be considered. More specifically, one of the intents associated with the particular skill will be identified as being the intent to which the utterance should be routed for handling. All other skills and intents are eliminated from consideration. Thus, this is a threshold associated with elimination from consideration of chatbots other than a chatbot that the user is currently interacting with.

In addition to confidence thresholds used to determine which intent or skill to route to, the routing subsystem 220 may apply one or more confidence thresholds for determining what types of responses (e.g., prompt messages) are presented to a user in connection with transitions between skills or intents. Examples of such confidence thresholds include:

Interrupt Prompt Confidence Threshold—Applies when an utterance has been matched to a different intent than the intent that the user is currently interacting with (e.g., a different intent within the same skill or an intent associated with another skill). When such a match occurs, it leads to a switch in dialog flow. If the confidence score for the matching intent is greater than or equal to the Interrupt Prompt Confidence Threshold, then the switch to the new dialog flow is performed without requesting the user to confirm that the user wants to switch dialog flows. Instead, a message may simply be presented to inform the user that the switch is about to occur. However, if the confidence score for the matching intent is less than this threshold, then the digital assistant may prompt the user to confirm whether the user wants to switch to the new dialog flow.

Exit Flow Confidence Threshold—Applies when an utterance causes a dialog flow to end. For example, the utterance could be "cancel this flow" or "exit." This is the minimum score required for the digital assistant to respond to an exit request with only a message. If the confidence score for the "Exit" system intent (described in the Chatbot System Overview section above) meets or exceeds this threshold, a message can be presented to inform the user about the end of the current dialog flow, e.g., "Exited ShowMenu intent in pizza ordering bot." Otherwise, if the confidence score for the Exit system intent is below this threshold, the digital assistant may output a prompt requesting the user to confirm that they want to exit the current dialog flow.

Once a skill bot 216 or a system intent has been identified, e.g., based on confidence scoring, the routing subsystem 220 can invoke the identified skill bot or system intent and can also generate, based on the utterance 202, an input to the skill bot or system intent. For example, as depicted in FIG. 2, the routing subsystem 220 may generate an input 235 for a skill bot being invoked. The input 235 could include an exact copy of the utterance 202. Alternatively, the input 235 could include a modified form of the utterance 202. For example, input 235 may correspond to the utterance 202 after removing one or more words such as "I," "would like," "please," or other words that are unnecessary as input for generating a response to the utterance (e.g., words that do not represent named entities or variables). The input 235 could also include information derived from the utterance 202 (e.g., the extracted information 205).

The input to the skill bot or system intent (e.g., the input 235) can be processed in accordance with a dialog flow that the skill bot or master bot has been configured with. As discussed above, a dialog flow defines operations or actions that a skill bot will take, e.g., how the skill bot responds to user utterances, how the skill bot prompts users for input, and how the skill bot returns data. Dialog flows can also be defined at the master bot level, e.g., for system intents. Thus, a response to the utterance 202 (e.g., an action to be performed by the digital assistant or a message to be presented to the user) could be generated based on the processing of the input to the skill bot or system intent.

Figure 3:
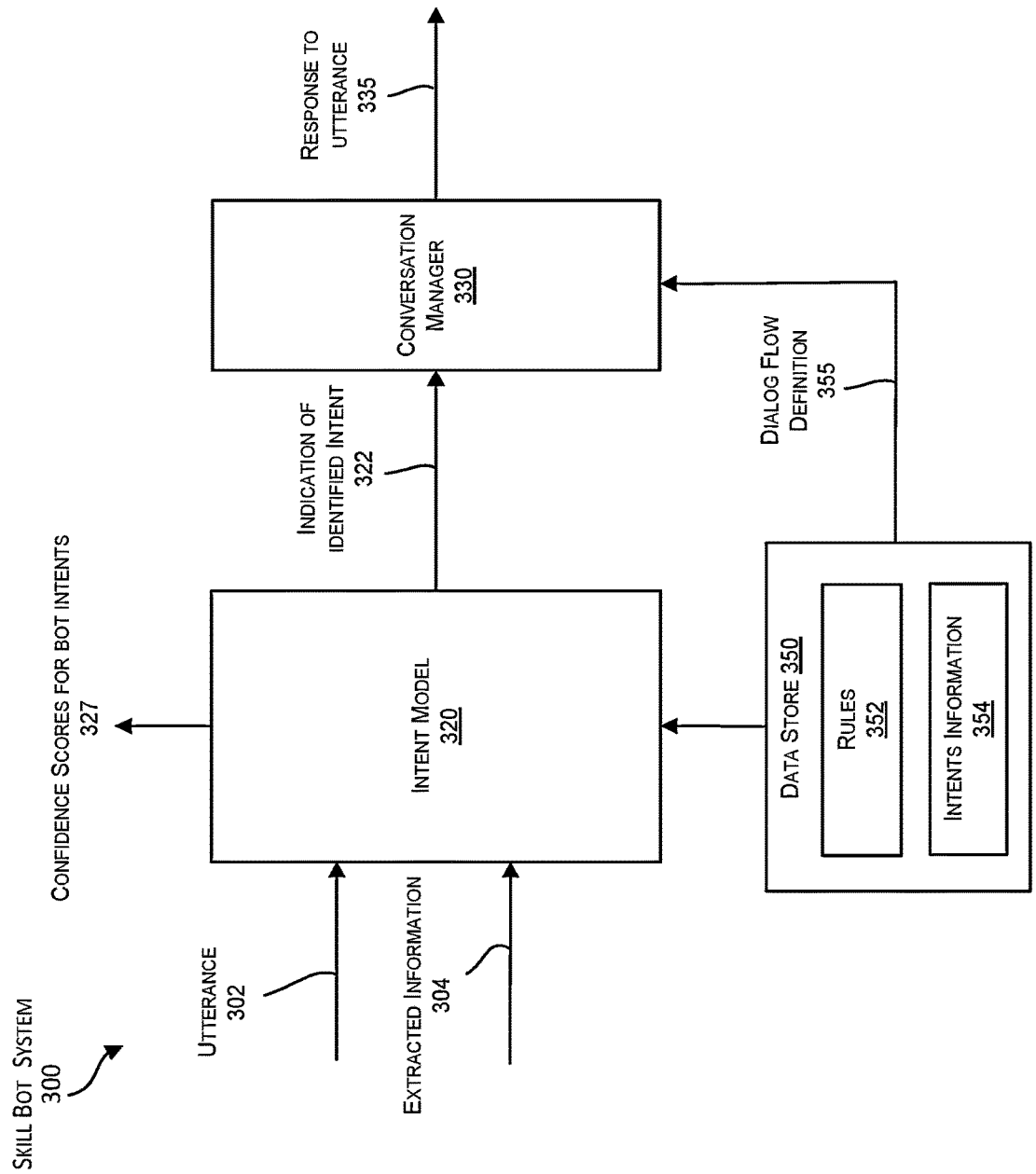
FIG. 3 is a simplified block diagram of a skill bot system according to certain embodiments.

The response to the utterance 202 can be provided by a particular component within the digital assistant. For example, the response could be an action performed using a built-in or custom component. In certain embodiments, responses are handled by a dialog engine. The dialog engine can be shared by the master bot and each of the skill bots. Alternatively, the master bot and each of the skill bots can have their own dialog engines (e.g., as shown in the embodiment of FIG. 3). The dialog engine acts as a conversation manager and its responsibilities could include executing the dialog flow that produces the response to utterance 202. Thus, the dialog engine may be configured to initiate state transitions and make calls to components associated with different states.

FIG. 3 is a simplified block diagram of a skill bot (SB) system 300 according to certain embodiments. SB system 300 may correspond to any of the skill bots 216 in FIG. 2 and can be implemented in software only, hardware only, or a combination of hardware and software. As shown in FIG. 3, the SB system 300 can include an intent model 320 and a dialog engine 330. However, as indicated above, the dialog engine 330 can be shared between a master bot and multiple skill bots. Accordingly, in some embodiments, the dialog engine 330 is local to a digital assistant.

Intent model 320 (also referred to as a skill model) operates in a similar manner to the skill bot model 224 in FIG. 2. The intent model 320 can be a rules-based and/or AI-based model configured to infer an intent for an utterance (e.g., the utterance 202). The intent model 320 can use the same input as the skill bot model 224 (e.g., the utterance 202 and the extracted information 205). Like the skill bot model 224, the intent model 320 could be an AI model that is pre-trained using training data that includes example utterances. However, unlike the skill bot model 224, the intent model 320 is configured to determine whether an utterance is a match to a particular intent. In contrast, the skill bot model 224 is configured to determine whether an utterance is a match to a particular skill bot. Accordingly, the training data for the intent model 320 could include, for each intent associated with the skill bot system 300, a set of utterances representative of the intent. Similarly, the training data for the skill bot model 224 could include, for each skill bot in the chatbot system, a set of utterances representative of the skill bot.

In some embodiments, training data and/or trained parameters for all predictive models employed by a digital assistant (e.g., system intent model 222, skill bot model 224, intent model 320) is maintained in a central location (e.g., data store 250). Alternatively, each skill bot can maintain its own training data and/or trained parameters in a separate data store. For example, training data or trained parameters for the intent model 320 could be obtained from a data store 350 accessible to the SB system 300. As shown in FIG. 3, the data store 350 can be configured to store rules 352 and intents information 354. The rules 352 may, for example, include a separate regex for each intent associated with the SB system 300. The intents information 354 may, for example, include training utterances for the intent model 320 and/or other intent-related configuration information. For instance, the intents information 354 could include one or more confidence threshold values specific to bot intents.

As shown in FIG. 3, the intent model 320 can be configured to generate confidence scores 327. The confidence scores 327 can include a separate score for each bot intent associated with the SB system 300 and can be generated based on the utterance 202 and/or the extracted information 205, in a manner similar to the generating of confidence scores for skills or system intents, as described above. Thus, the confidence scores 327 in FIG. 3 may correspond to a subset of the confidence scores 227 in FIG. 2.

Upon identifying an intent as matching the utterance 202 (e.g., based on applying one or more confidence thresholds to the confidence scores 327), the intent model 320 can output an indication 322 of the identified intent to the dialog engine 330. The identified intent could be the same intent that is currently being used by the SB system 300 to interact with the user. In some scenarios, the identified intent is a different intent than the intent currently being used by the SB system 300. This might happen, for example, when the current conversation with the user relates to a particular task that the SB system 300 is capable of performing and the utterance 202 pertains to a different task that the SB system 300 is capable of performing. In such scenarios, the dialog engine 330 can trigger a switch from a dialog flow associated with the current intent to a dialog flow associated with the identified intent. In response to receiving the indication 322, the dialog engine 330 may determine a response 335 to the utterance 202. For example, the response 335 may correspond to one of the DA responses 112 in the embodiment of FIG. 1 and could be an action or message specified in a dialog flow definition 355 configured for the SB system 300. For instance, the dialog engine 330 could access the dialog flow definition 355 from the data store 350 and determine, based on the dialog flow definition 355, a state associated with the indicated intent as being the next state to transition to.

ROUTING EXAMPLES

The following examples illustrate routing behavior in different scenarios.

Example 1: Definitive Match to a Single Skill Bot

System Intent Confidence Thresholds:
Confidence Threshold: 60%
Confidence Win Margin: 10%
Consider All Confidence Threshold: 80%
Skill Bot Confidence Thresholds:
Confidence Threshold: 60%
Confidence Win Margin: 10%
Consider All Confidence Threshold: 80%
Dialog:
User: order pizza
DA: How old are you?
Confidence Score Results:
No system intent has a score above 60%.
Pizza Ordering skill score: 100%
Clothing Store skill score: 22%
OrderPizza intent (within pizza ordering skill) score: 100%

In example 1, the OrderPizza intent is assigned a score of 100% (e.g., by an intent model configured for the pizza ordering skill). The OrderPizza intent is therefore identified as a matching intent for the utterance "order pizza." Similarly, the pizza ordering skill is assigned a score of 100% (e.g., by a skill bot model of a master bot or digital assistant) and is identified as a matching skill. Accordingly, the utterance is routed to the OrderPizza intent for handling. As shown above, the response generated based on a dialog flow associated with the OrderPizza intent is a question intended to verify that the user is old enough to order pizza: "How old are you?"

Example 2: Match to Multiple Bots with Disambiguation Dialog

System Intent Confidence Thresholds:
Confidence Threshold: 60%
Confidence Win Margin: 10%
Consider All Confidence Threshold: 80%
Skill Bot Confidence Thresholds:
Confidence Threshold: 40%
Confidence Win Margin: 10%
Consider All Confidence Threshold: 80%
Bot Intent Confidence Thresholds:
Confidence Threshold: 40%
Confidence Win Margin: 10%
Consider All Confidence Threshold: 80%
Dialog:
User: what is my account balance
DA: Do you want to go to: (1) GiftCardBalance in Clothing store skill or (2) Balances in Banking skill?
Confidence Score Results:
No system intent has a score above 60%.
Banking skill score: 94%
Clothing store skill score: 91%
Pizza ordering skill score: 33%
Balances intent (within banking skill) score: 94%
GiftCardBalance intent (within clothing store skill) score: 91%

In example 2, the banking skill and the clothing store skill are identified as candidate skills for the utterance "what is my balance." The pizza ordering skill's score is below the Confidence Threshold for skill bots, and is therefore deemed not to be a candidate. Further, the Balances intent of the banking skill and the GiftCardBalance intent of the clothing store skill are identified as candidate intents. Both candidate intents satisfy the bot intent-specific confidence thresholds indicated above. In particular, the scores for the GiftCardBalance intent and the Balance intent both satisfy the Consider All Confidence Threshold for bot intents (80%). Accordingly, the digital assistant prompts the user to confirm which of these two intents to proceed with. Thus, if the user responds to the prompt with the utterance "balances in banking," then the next confidence score computed for the Balances intent might be 100%. Similarly, if the user responds with the utterance "gift card balance," then the next confidence score computed for the GiftCardBalance intent might be 100%.

Example 3: Context Aware Routing—Current Context Weighted More Heavily

Continuing with example 2 above, the dialog following the prompt for disambiguation might be as follows:
User: balances in banking
DA: For which account do you want your balance? (1) savings (2) checking, (3) credit card
User: checking
DA: The balance in your checking account (903423-123) is $2,404.53
User: what is my balance
DA: For which account do you want your balance? (1) savings (2) checking, (3) credit card In example 3, the user responds to the disambiguation prompt with an utterance indicating that the user wants to proceed with checking their bank balance using the banking skill. The digital assistant responds by asking the user which account the user wants to know the balance of In response to the utterance "checking," the digital assistant may invoke the Balances intent with "checking" as the value for an AccountType entity configured for the banking skill. The response determined by the dialog flow associated with the Balances intent is the action of presenting the user's account balance, in this case, the balance in the user's checking account. The user is now in the banking skill context.

As shown above, when the user inputs "what is my balance" after being presented with the balance in their checking account, the digital assistant matches this utterance to the banking skill and therefore once again asks the user which account the user wants to know the balance of Unlike in example 2, where the user is prompted to disambiguate, the utterance "what is my balance" can be definitively matched to the banking skill as a result of the confidence score for the banking skill satisfying the Consider Only Current Context Threshold discussed earlier. For example, if the Consider Only Current Context Threshold is set to 80% and the banking skill or the Balances intent is a 90% match for "what is my balance," then all other skills (e.g., the clothing store skill in example 2) are eliminated from further consideration. Consequently, the utterance is matched to an intent configured for the banking skill, in this example, the Balances intent.

In certain embodiments, the digital assistant or master bot can maintain a history of prior user interactions. For instance, the history can include the last skill or a certain number of most recent skills that the user engaged in conversation with. More recent or more used skills (in terms of frequency of use or total number of use instances) can be weighted more heavily than less recent or less used skills.

Example 4: Context Aware Routing—Prioritize Help State for Current Context Over Help System Intent Suppose that the digital assistant invokes a banking skill based on user input of the utterance "what is my balance in bank." Based on a dialog flow configured for the banking skill, the digital assistant may prompt the user to indicate which account the user wants to know the balance of, and the user may respond to this prompt with a second utterance "help." The digital assistant may determine that the only match to the utterance "help" is the "Help" system intent (described in the Chatbot System Overview section above). For instance, the Help system intent could be assigned a score of 100% and none of the intents associated with any of the skill bots may have a qualifying score. The digital assistant could respond to the second utterance by initiating a dialog flow associated with the Help system intent. However, since the user is currently in the banking skill context, the digital assistant may instead present help-related dialog specific to the banking skill, for example, as follows:
User: help
DA: You are at banking skill. Here are some things you can do: (1) go to banking skill home menu, (2) check my balance, (3) send money In some embodiments, the help-related dialog is generated as a help card with fields populated based on information stored for the current skill. For example, the help card could include a field for the invocation name of the skill, a field for a brief description of the skill, and a field with a list of example utterances for the skill. The information for populating the help card could be specified by a skill bot designer as parameters for a help state of the skill.

Example 5: Context Aware Routing—Invocation Name of Skill not Associated with Current Context As discussed above, a skill can be explicitly invoked based on an utterance containing an invocation name of the skill. For example, if "Bank" is the invocation name of the banking skill in example 3, the digital assistant may invoke the banking skill in response to the utterance "what is my balance in Bank." Upon determining that the banking skill is being explicitly invoked, the digital assistant could also try to match the utterance to an intent of the banking skill (e.g., the Balance intent) or let the banking skill perform the match. Explicit invocation takes precedence over other factors or metrics (such as confidence score) in deciding where to route an utterance. As a result, once an invocation name has been detected in an utterance, the digital assistant may disregard confidence scores of other skills and system intents. In some implementations, the digital assistant may not even compute such scores once the skill being explicitly invoked has been identified.

The explicit invocation behavior discussed above assumes that the user is not currently interacting with a skill. However, if the current context is a particular skill, the user inputs an utterance containing an invocation name not associated with the particular skill (e.g., the invocation name of a different skill), and there is a match to an intent associated with the current context, then the digital assistant may respond by prompting the user to disambiguate. For example:
User: order pizza
DA: How old are you?
User: cancel my order in ClothingStore
DA: do you want to go to: (1) CancelOrder intent in ClothingStore or (2) CancelPizza intent in PizzaStore
In example 5, the user is in the pizza ordering context after providing the utterance "order pizza." The next utterance "cancel my order in ClothingStore" contains the invocation name "ClothingStore" of a clothing store skill. Further, this utterance could match to an intent configured for the pizza ordering skill (e.g., "CancelPizza"). Accordingly, the digital assistant may prompt the user to confirm which skill the user wants to proceed with.

Example 6: Context Aware Routing—Prioritize System Intents when not Currently in a Skill Context Suppose that the utterance "help order pizza" is received while the user is in the digital assistant or master bot context, i.e., not in a skill bot context. In this scenario, the digital assistant could disregard or omit computing confidence scores for any skills. Instead, assuming that no other system intents match to the utterance, the digital assistant could route the utterance to the Help system intent.

Example 7: Context Pinning after Explicit Invocation

As discussed above in example 3, matches to intents associated with the current context/skill can be weighted more heavily compared to other skills by setting a value of the Consider Only Current Context Threshold. A similar preference for the current context can be applied in situations involving an explicit invocation. In particular, the digital assistant may be configured to eliminate all other skills and, by extension, intents associated with those skills from consideration as a potential match to one or more utterances received after an utterance which resulted in an explicit invocation. In this manner, the conversation can be "pinned" to the current skill. This is because in the case of an explicit invocation, it is usually safe to assume that the next utterance relates to the skill that was just invoked. For example, the digital assistant could explicitly invoke the pizza ordering skill in response to the utterance "go to PizzaStore" and then consider only intents associated with the pizza ordering skill for matching to the next utterance (e.g., "order pizza").

Pinning can be applied to a certain number of subsequent utterances to define a window within which matches to other skills are ignored. In certain embodiments, this window may be a size of one so that only the utterance that immediately follows an explicit invocation is pinned to the current skill.

In certain embodiments, pinning is performed only when an explicit invocation fails to route to an intent (e.g., an utterance that contains an invocation name of a skill, but no indication of which intent associated with the skill to use). For explicit invocations where the intent is identified, the current context can be weighted more heavily, but other skills may still be considered (see example 3 above).

In certain embodiments, when no match is found for an utterance while the conversation is pinned, the utterance can be handled at the skill level instead of handling the utterance using the UnresolvedIntent system intent. For instance, the pizza ordering skill could be configured with its own intent for resolving utterances that fail to match to any other intent associated with the pizza ordering skill (e.g., an UnresolvedIntent configured for the pizza ordering skill).

Example 8: Resuming an Interrupted Flow

In certain embodiments, the digital assistant can be configured such that when an input utterance causes a switch to a different skill or a different intent within the same skill, the digital assistant will prompt the user to confirm whether the user wants to resume interacting with the earlier skill/intent (e.g., in the same state where the earlier skill/intent left off). The prompt can, for example, be of the form "do you want to resume (earlier intent) in (earlier skill)?" In some embodiments, the digital assistant can also present a message indicating that the dialog flow associated with the earlier intent/skill is being resumed.
User: order pizza
DA: How old are you?
User: how much did I spend for dining?
DA: Do you want to switch to Track Spending in Finance Skill now? Yes/No
User: Yes
DA: You spent $40 on restaurant
DA: Do you want to resume OrderPizza in Pizza Skill now? Yes/No
User: Yes
DA: How old are you?

Example 9: Selective Interception of Utterances when in Skill Context

In certain embodiments, the digital assistant is configured to permit the skill that the user is currently interacting with to handle utterances that are received after the skill has been invoked. However, in certain circumstances, the digital assistant may intervene by intercepting and making routing decisions for such utterances. For example, the digital assistant could be configured with the following features:

- Always check input utterances for a match to the "Exit" system intent (described in the Chatbot System Overview section above) and for explicit invocations. This allows the user to exit the current context or explicitly invoke a different skill at any time.
- If no match to Exit system intent and not an explicit invocation, pass the utterance to the current skill for handling.
- Intercept the utterance if the current skill fails to understand the utterance or the current skill tries to make a local routing decision (e.g., route to a different intent associated with the current skill).

By implementing the features listed above, the digital assistant can minimize the number of routing decisions that are made at the digital assistant or master bot level, instead allowing the current skill to handle utterances according to the dialog flow definition for the current skill. As indicated above, there are some scenarios where the digital assistant can make a routing decision while the user is in a skill context. For instance, the digital assistant can always check to see if an utterance matches to the Exit system intent (e.g., the user inputs "cancel pizza" to exit the pizza ordering skill). The digital assistant can also check for explicit invocations by examining utterances for invocation names. If there is no explicit invocation and no match to the Exit system intent, the digital assistant may pass the utterance to the current skill for handling.

After passing an utterance to the current skill for handling, the digital assistant can still intervene sometimes. For instance, as indicated above, the current skill may not be able to understand the meaning of the utterance. This can occur, for example, when the current skill expects a value for a particular named entity, but the user provides an utterance that is non-responsive or contains an invalid value (e.g., a value that is invalid for the named entity, such as a numerical value that is out of expected range or a decimal value when an integer is expected). The digital assistant can detect this failure to understand the utterance in various ways. In some embodiments, the digital assistant monitors a "system.invalidUserInput" flag variable that is set by a skill when the skill does not understand an utterance.

The digital assistant can also intervene in response to detecting that the current skill is attempting to perform local routing. The digital assistant may defer to the current skill the handling of utterances that do not trigger a switch to a different destination associated with the current skill (e.g., a dialog flow state associated with a different intent). However, if the current skill is attempting local routing, this means there is a possibility that the current skill is not the appropriate skill to use for handling the utterance. In such situations, the digital assistant can override or bypass the local routing of the current skill by determining whether other available skills are a potential match to the utterance and making a routing decision accordingly (e.g., based on evaluating confidence scores for all available skills). In some embodiments, the digital assistant detects a local routing attempt by intercepting a call from a skill to a component that infers intents (e.g., the System.Intent component mentioned above).

In some embodiments, whether the digital assistant will intervene after passing an utterance to a particular skill for processing is configurable by setting a value of a "daIntercept" parameter in the dialog flow definition for the particular skill. For instance, the daIntercept parameter could be set to a value of "never" to prevent the digital assistant from overriding local routing decisions made by the particular skill.

As shown in the example dialog below, the utterance "what is my balance" is a non-sequitur because it does not logically follow the preceding DA response "Here are our pizzas you can order today." When this occurs, the pizza ordering skill may attempt to perform local routing, e.g., by computing confidence scores, using its intent model 320, for each intent with which the pizza ordering skill has been configured. The digital assistant can prevent the pizza order skill from routing to one of the pizza ordering skill's intents by making a routing decision based on consideration of other skills that are available (e.g., a finance or banking skill). For instance, as shown below, the digital assistant could, based on computing a threshold-satisfying confidence score for the finance skill, prompt the user to confirm whether the user wants to proceed to the finance skill.

Figure 4:
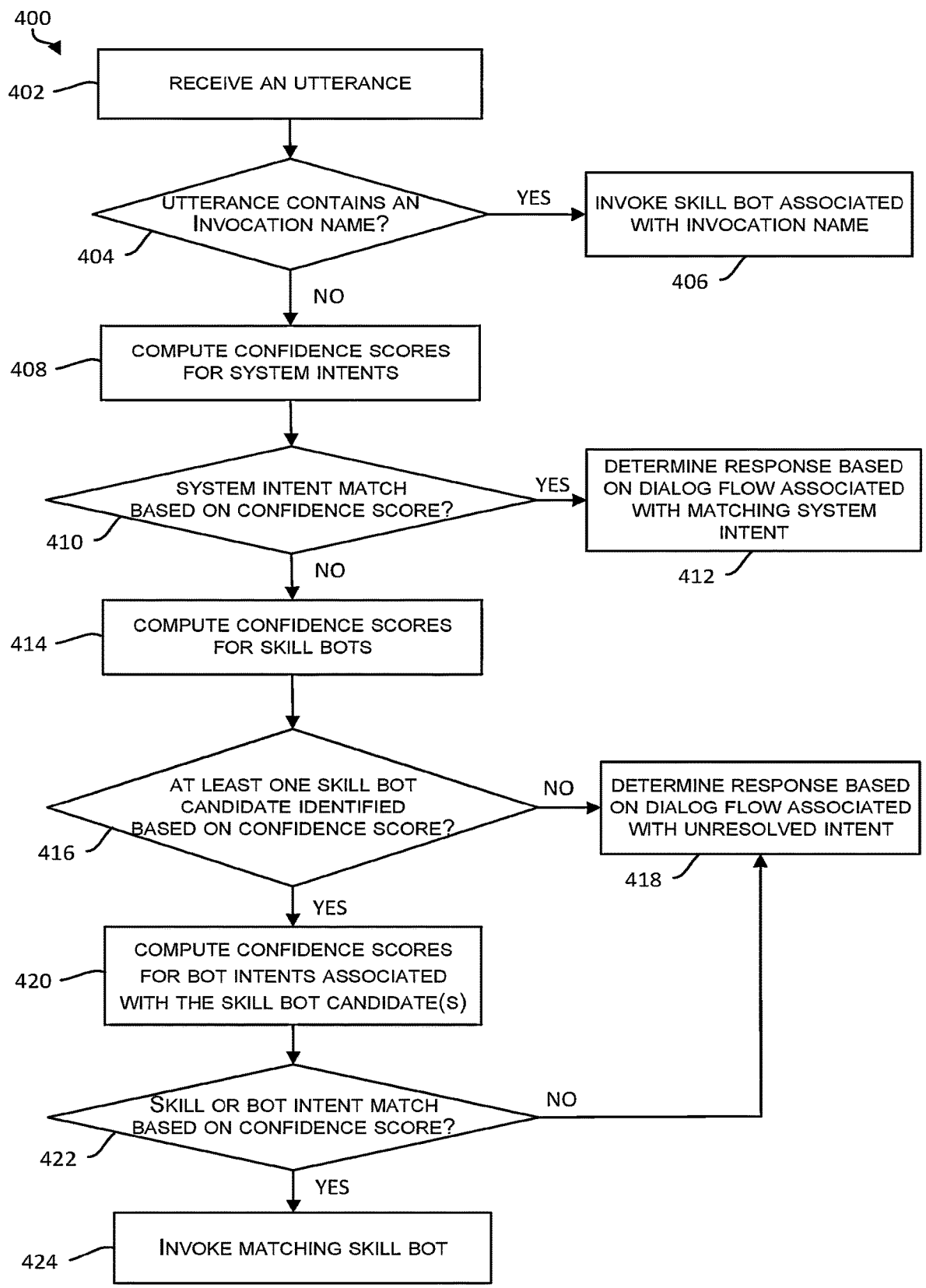
FIG. 4 is a simplified flowchart depicting a process for routing an utterance according to certain embodiments.
Figure 5:
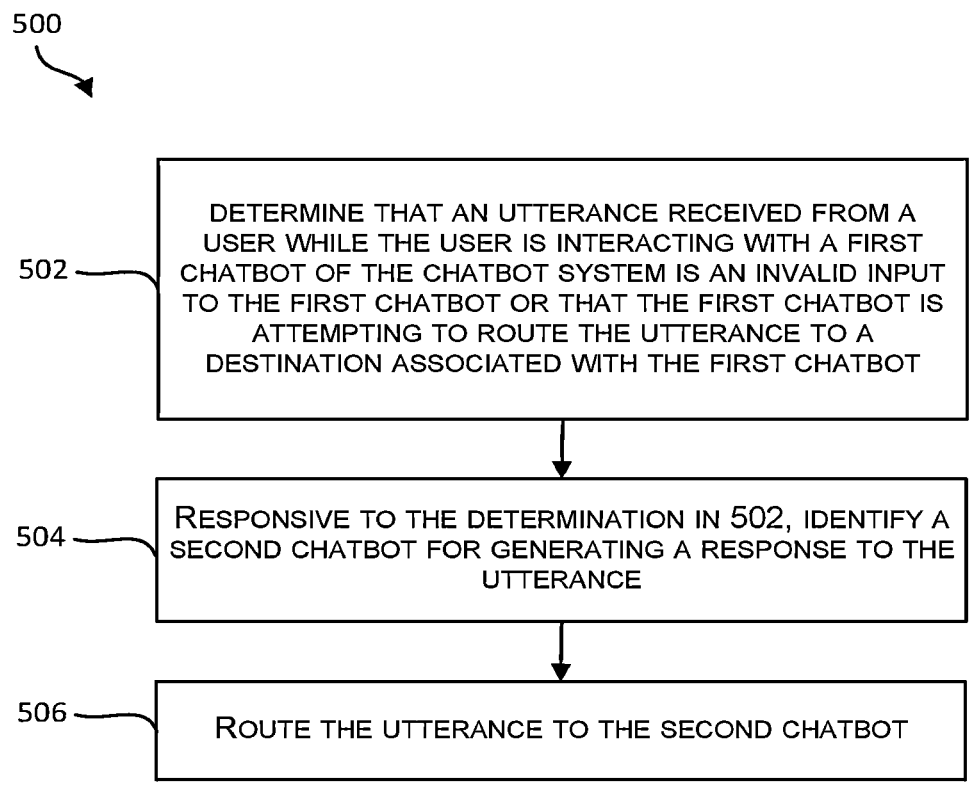
FIG. 5 is a simplified flowchart depicting a process for context aware routing according to certain embodiments.

User: order pizza
DA: How old are you?
User: 18 years old
DA: Here are our pizzas you can order today: (1) Cheese, (2) Pepperoni, (3) See more pizzas
User: what is my balance
DA: Exited OrderPizza in pizza ordering skill
DA: Do you want to go to: (1) Balances in Finance skill, (2) Ask question in Finance skill, (3) None of the above Example Methods FIGS. 4 and 5 depict routing-related processing according to certain embodiments. The processing depicted in FIGS. 4 and 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The methods presented in FIGS. 4 and 5 and described below are intended to be illustrative and non-limiting. Although FIGS. 4 and 5 depict the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIGS. 4 and 5 may be performed by a digital assistant or chatbot system, e.g., the digital assistant 106. More specifically, in a master bot-child bot architecture, the processing depicted in FIGS. 4 and 5 can be performed by a master bot (e.g., the master bot system 200 in FIG. 2) that is in communication with a child bot (e.g., the skill bot system 300 in FIG. 3).

FIG. 4 is a simplified flowchart depicting a process 400 for routing an utterance according to certain embodiments. At 402, an utterance is received by a chatbot system. In some embodiments, utterances are initially received by a master bot that routes the utterance to a skill bot or a system intent for generating responses to the utterances. As indicated above, an utterance can be a text utterance or a speech utterance. If the utterance is supplied by a user as a speech utterance, the utterance can be converted to text for input to the processing in 404.

At 404, the utterance received in 402 is examined to determine whether the utterance contains an invocation name of a skill bot. If so, then the skill bot is explicitly invoked at 406 (e.g., based on a call from the master bot to the skill bot). Otherwise, processing proceeds to 408.

At 408, confidence scores are computed for available system intents. As indicated above, examples of such system intents include Help, Exit, and UnresolvedIntent. For each system intent, a corresponding confidence score is computed that indicates a likelihood of the utterance from 402 being representative of the system intent. In the examples described above, a higher confidence score is associated with a greater degree of likelihood. The computing of the confidence scores in 408 can be performed using a rules-based and/or artificial intelligence (e.g., machine-learning) based predictive model such as the system intent model 222 in FIG. 2.

At 410, a determination is made whether there is a match to a system intent based on the confidence score(s) computed in 408. As indicated above, in order to match to an utterance, a system intent may be required to satisfy one or more confidence thresholds, such as the Confidence Threshold, the Confidence Win Margin, and/or the Consider All Threshold. For instance, to be treated as a candidate for matching, the system intent may need to have a score that is at least equal to the Confidence Threshold. Once it is determined that the system intent is a candidate by virtue of satisfying the Confidence Threshold, it can be determined whether the system intent is a match based on satisfying any additional confidence thresholds imposed by the digital assistant. For instance, the system intent can be deemed to be a match only if the Confidence Win Margin is also satisfied. If a matching system intent is identified based on the determination in 410, processing proceeds to 412. Otherwise, processing proceeds to 414.

At 412, a response to the utterance is determined based on a dialog flow associated with the matching system intent. The response could be an action performed by the digital assistant (e.g., by the master bot). Alternatively, the response could be dialog (e.g., a text message containing information for the user or a prompt requesting input from the user).

At 414, confidence scores are computed for available skill bots. Similar to the confidence scores computed in 408 above, for each skill bot, a corresponding confidence score can be computed that indicates a likelihood of the utterance from 402 being representative of a task that the skill bot can perform. The confidence scores in 414 may be generated using a predictive model configured based on information relating to all available skill bots. For example, the confidence scores in 414 may be computing using the skill bot model 224 in FIG. 2. As indicated above, a predictive model can be pre-trained using example utterances. For example, the training data for the predictive model that computes the confidence scores in 414 can include, for each skill bot, a set of utterances representative of tasks the skill bot is configured to perform. In some embodiments, the computing of confidence scores for skill bots in 414 may be performed concurrently with the computing of confidence scores for system intents in 408.

At 416, a determination is made whether there is at least one skill bot candidate that has been identified based on the confidence scores computed in 414. To qualify as a candidate, a skill bot may be required to satisfy one or more confidence thresholds, e.g., a skill bot-specific Confidence Threshold. If no skill bot candidate has been identified, then processing proceeds to 418. Otherwise, processing proceeds to 420.

At 418, a response to the utterance is determined based on a dialog flow associated with an unresolved intent (e.g., the UnresolvedIntent system intent). For example, the dialog flow associated with the unresolved intent could provide for output of the message "Sorry, I don't understand" followed by a prompt that includes a hint for the user, for example, "Here are some things you can say . . . ."

At 420, confidence scores are computed for intents associated with the skill bot candidate(s). For example, a separate confidence score can be computed for each intent that a skill bot candidate is configured with. This makes it possible to evaluate every intent of every skill bot candidate for a possible match to the utterance. In some embodiments, the confidence scores in 420 are computed using a predictive model that is specific to a particular skill bot. For example, confidence scores for intents of a pizza ordering bot could be computed using an intent model (e.g., an instance of the intent model 320 in FIG. 3) that has been trained using utterances representative of the various intents of the pizza ordering bot. Thus, a separate predictive model may apply to each skill bot candidate.

At 422, a determination is made whether there is a match to a skill bot or a bot intent. The determination in 422 can be based on the confidence scores computed for skill bots in 414 and/or based on the confidence scores computed for bot intents in 420. For instance, in some embodiments, a skill bot can be deemed a match to an utterance when the confidence score for the skill bot satisfies one or more confidence thresholds, such as the Confidence Threshold, the Confidence Win Margin, and/or the Consider All Threshold. Similarly, a bot intent can be deemed a match to an utterance when the confidence score for the skill bot satisfies one or more confidence thresholds, such as the Confidence Threshold, the Confidence Win Margin, and/or the Consider All Threshold. Accordingly, a skill bot candidate can be identified as being a match to an utterance based on the skill bot's overall confidence score or based on a confidence score for a particular intent associated with the skill bot candidate. If no match is determined in 422, then processing proceeds to 418 (described above). Otherwise, processing proceeds to 424.

At 424, the matching skill bot is invoked, for example, through a call from the master bot. The skill bot can be invoked in a particular state. For instance, if an intent of the skill bot was deemed a match, then the skill bot can be invoked in a state associated with the matching intent. Alternatively, if the skill bot matched based on its overall confidence score instead of a confidence score for a particular intent, the skill bot could be invoked in a default or starting state.

FIG. 5 is a simplified flowchart depicting a process 500 for context-aware routing according to certain embodiments. The processing in FIG. 5 assumes that a user is currently interacting with a skill bot, i.e., in a particular skill context. Thus, a skill bot has already been invoked by the time the process 500 begins at 502.

At 502, a determination is made that (i) an utterance received from a user while the user is interacting with a first chatbot of a chatbot system is an invalid input to the first chatbot or (ii) the first chatbot is attempting to route the utterance to a destination associated with the first chatbot. As discussed earlier, there are various ways in which these two situations can be detected, such as monitoring the status of a flag variable indicating whether a skill bot has received an invalid input, or intercepting a call from a skill to a component that infers intents. If neither of these situations occurs, then the utterance can be handled according to the dialog flow definition configured for the first chatbot. However, as discussed earlier, there may be certain situations where an utterance is intercepted (e.g., by a master bot) before reaching the skill bot that the user is interacting with (e.g., invocation of the Exit system intent or an explicit invocation of another skill bot). If either (i) or (ii) is true, then processing proceeds to 504.

At 504, a second chatbot is identified, in response to the determination in 502, for generating a response to the utterance received while the user is interacting with the first chatbot. The second chatbot can be identified based on computing one or more types of confidence scores. For example, the processing in 504 can be implemented using the same steps discussed above in connection with blocks 408 to 424 in FIG. 4. Thus, the second chatbot could be identified by computing, using a predictive model, separate confidence scores for the first chatbot and the second chatbot and determining that the second chatbot is a match to the utterance based on a confidence score computed for the second chatbot satisfying one or more confidence score thresholds. However, as indicated above, the processing in 408 to 424 does not always lead to a response being generated by a skill bot. For example, in some instances, the response to an utterance is generated based on a system intent. Further, it may be possible that the skill bot identified for generating the response is the same bot that the user is currently interacting with, i.e., the first chatbot is the same as the second chatbot.

At 506, the utterance received while the user is interacting with the first chatbot is routed to the second chatbot. If the first chatbot and the second chatbot are different, the digital assistant may output a message indicating that a switch to the second chatbot is occurring, or the digital assistant may prompt the user to confirm that the user wants to proceed with the switch. As discussed earlier, such a message or prompt can be based on the Interrupt Prompt Confidence Threshold. Accordingly, there can be additional interaction between the user and the digital assistant before the second chatbot is permitted to generate a response to the utterance.

Regardless of whether the first chatbot and the second chatbot are different, the digital assistant may resume the earlier interaction between the user and the first chatbot, either automatically or after prompting the user for confirmation. For example, upon conclusion of a dialog flow associated with the second chatbot, the digital assistant may prompt the user to confirm whether the user wants to return to a dialog flow that is associated with the first chatbot and that was interrupted as result of the processing in 502 to 506.

Example Computing Environments for Implementing a Chatbot System

Figure 6:
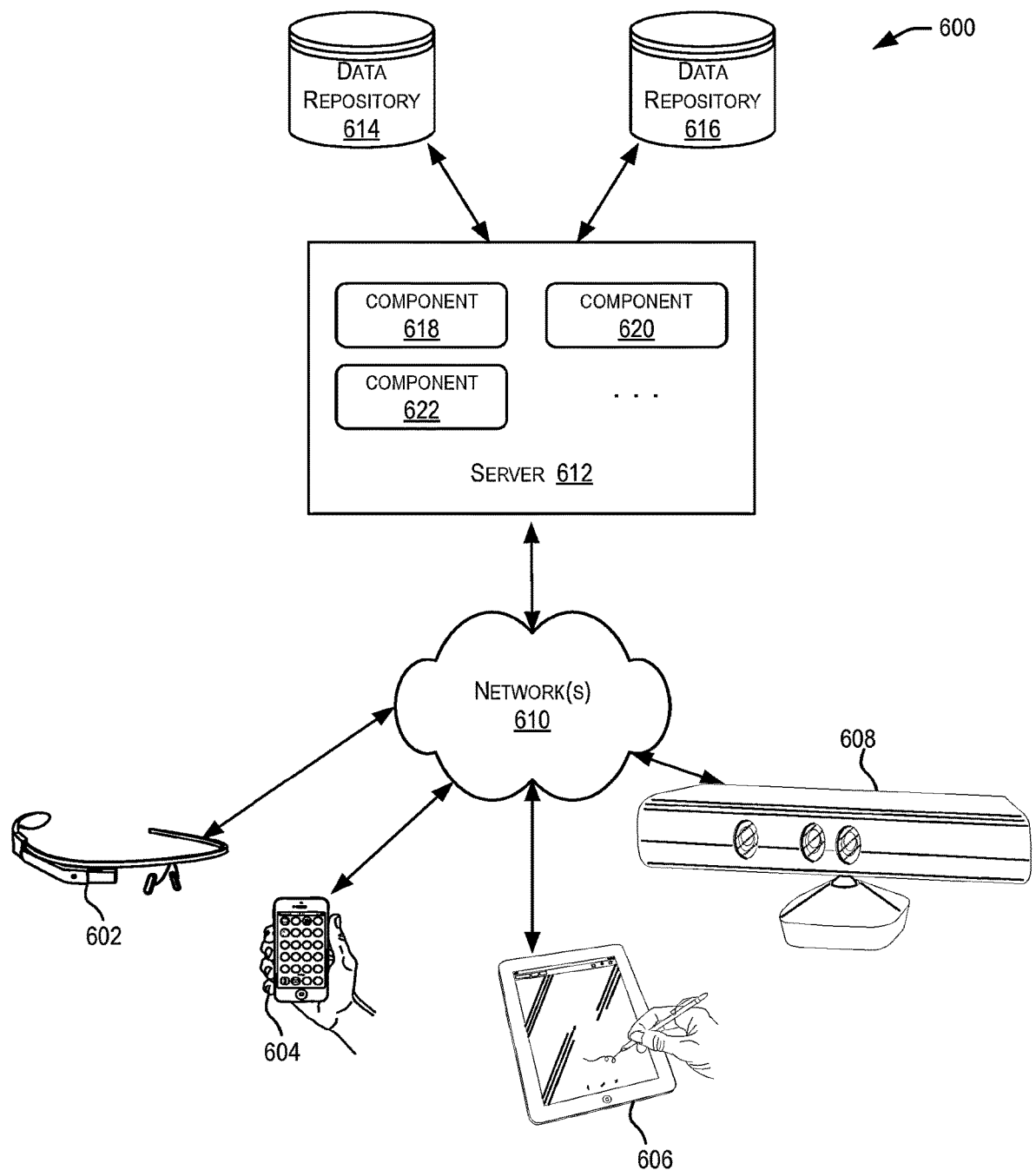
FIG. 6 is a simplified diagram of a distributed system for implementing one or more embodiments.

FIG. 6 depicts a simplified diagram of a distributed system 600 for implementing an embodiment. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various embodiments, server 612 may be adapted to run one or more services or software applications that enable a master bot or digital assistant to facilitate a conversation between a user and a skill bot.

In certain embodiments, server 612 may also provide other services or software applications that can include non-virtual and virtual environments. In some embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to more configure a master bot and/or skill bot, register or unregister a skill bot, and engage in conversation with the master bot and/or a registered skill bot, in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the IEEE 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of the data repositories 614, 616 may be used to store conversation histories, master bot and skill bot configuration information, routing rules, and/or other chatbot-related information. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 614, 616 may also be used by applications to store application data. The data repositories used by applications may be of different types such as, for example, a key-value store repository, an object store repository, or a general storage repository supported by a file system.

Figure 7:
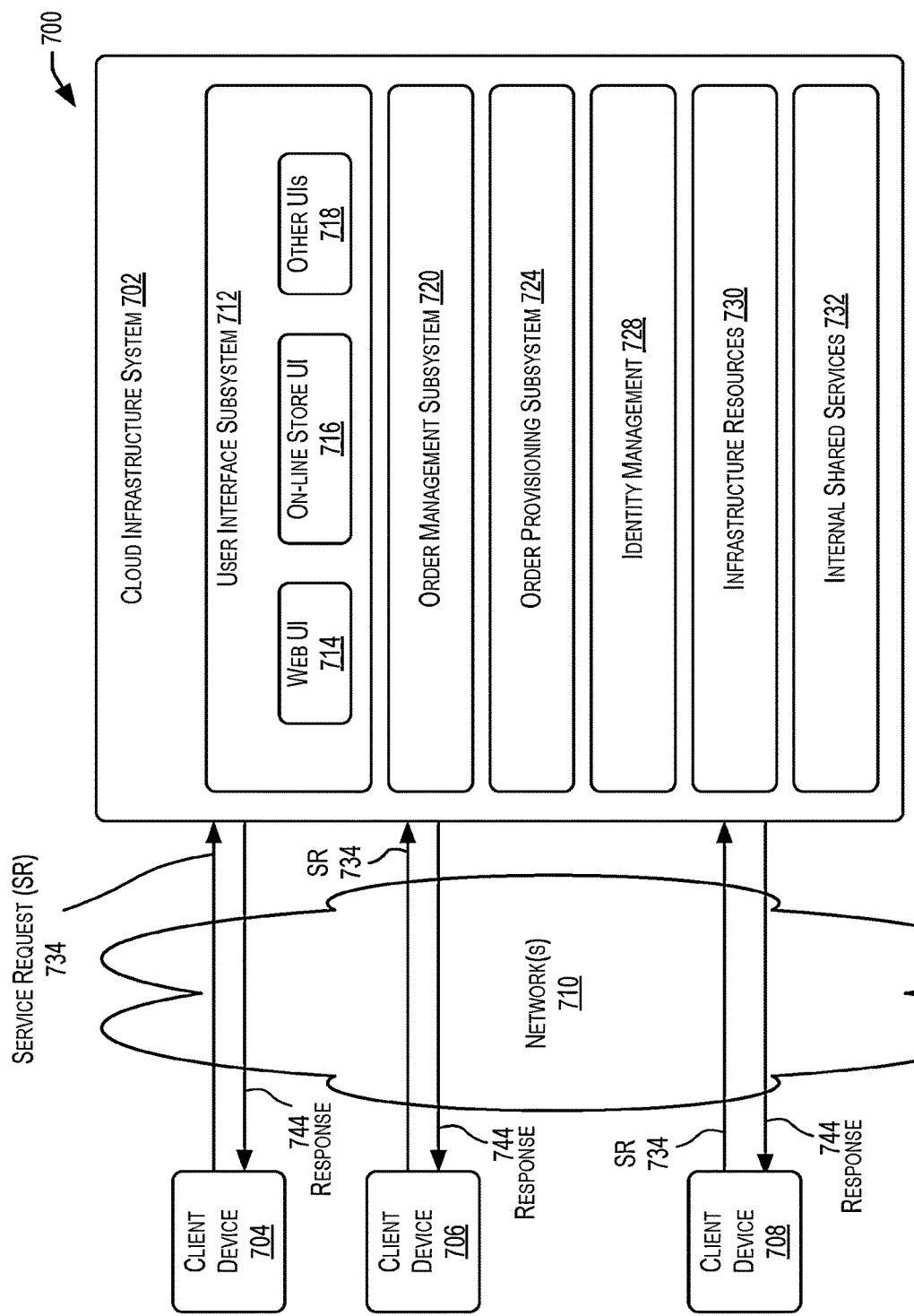
FIG. 7 is a simplified block diagram of a cloud-based system environment in which various chatbot-related services may be offered as cloud services, in accordance with certain embodiments.

In certain embodiments, the chatbot-related functionalities described in this disclosure may be offered as services via a cloud environment. FIG. 7 is a simplified block diagram of a cloud-based system environment in which various chatbot-related services may be offered as cloud services, in accordance with certain embodiments. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other embodiments, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative embodiments.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain embodiments, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure. For example, a customer, via a subscription order, may order one or more services provided by cloud infrastructure system 702. Cloud infrastructure system 702 then performs processing to provide the services requested in the customer's subscription order. For example, a customer may submit a subscription order for registering a skill bot with a master bot or otherwise adding/configuring a skill bot within a chatbot system. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other embodiments, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request a chatbot-related service described in this disclosure.

In some embodiments, the processing performed by cloud infrastructure system 702 for providing chatbot-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for determining, based on usage trends for a group of users, which skill or intent to route a particular utterance to. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain embodiments, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, a service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for a chatbot-related service offered by cloud infrastructure system 702. As part of the order, the customer may provide information identifying a set of users who are authorized to access a particular skill or bot.

In certain embodiments, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/ scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain embodiments, for a customer requesting the chatbot-related service, the response may include a confirmation that a bot has been successfully registered or configured, and is therefore ready to begin interacting with end-users.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain embodiments, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
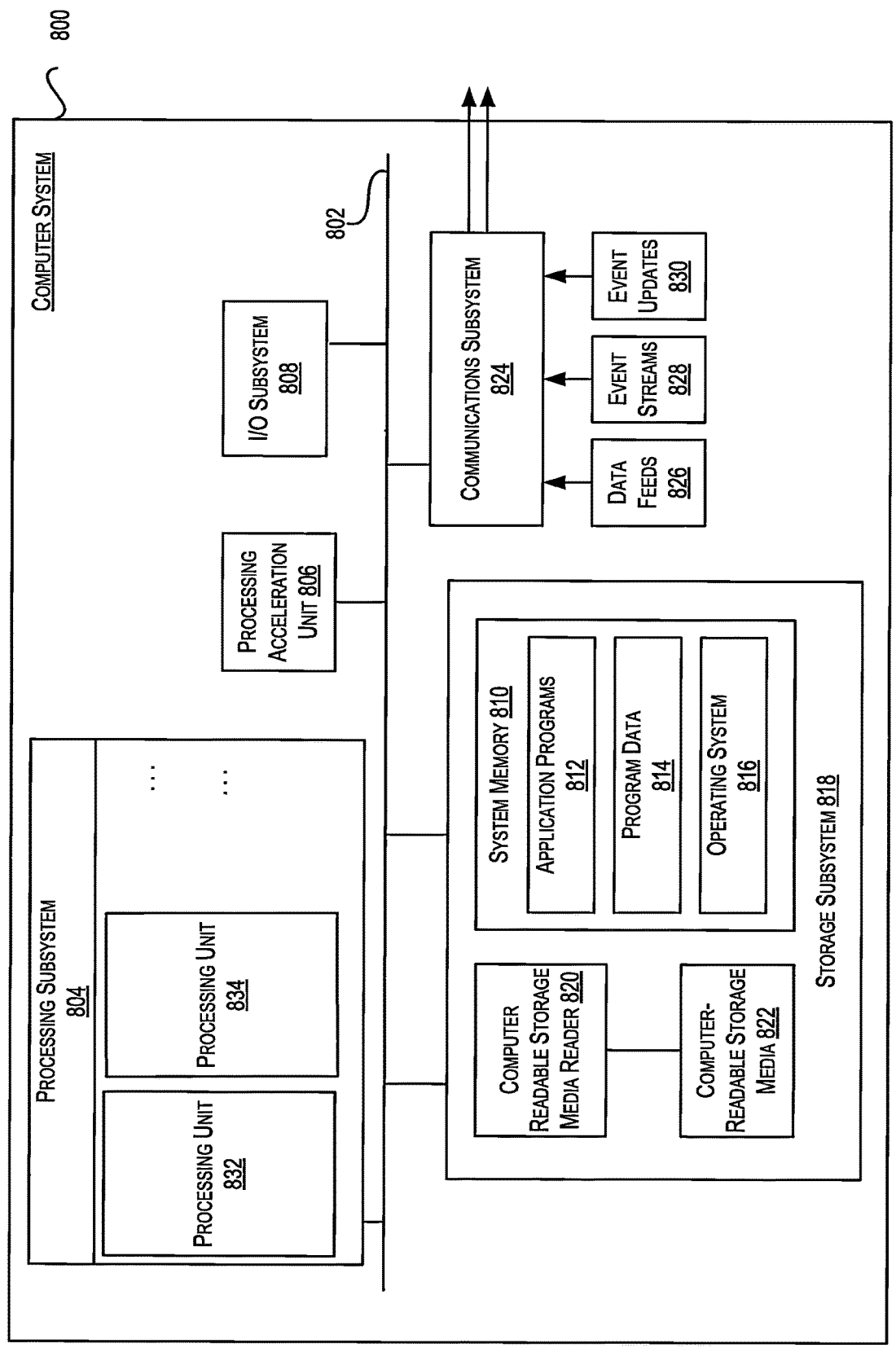
FIG. 8 illustrates an exemplary computer system that may be used to implement certain embodiments.

FIG. 8 illustrates an exemplary computer system 800 that may be used to implement certain embodiments. For example, in some embodiments, computer system 800 may be used to implement any of various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM may contain data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some embodiments. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, the communication subsystem may be used for communications between a master bot and an individual bot in connection with a routing decision, or for communications between an individual bot and a user after the user has been routed to the individual bot.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   determining, by a computer-implemented chatbot system comprising a master bot and a plurality of chatbots, whether an utterance received from a user while the user is interacting with the chatbot system includes an invocation name of a particular chatbot of the plurality of chatbots or does not include the invocation name of the particular chatbot, wherein the master bot is associated with a set of system intents and each chatbot of the plurality of chatbots is associated with a set of chatbot intents;
   in response to determining that the utterance includes the invocation name, routing the utterance to the particular chatbot; and
   in response to determining that the utterance does not include the invocation name, routing the utterance to the master bot or a chatbot intent of the set of chatbots intents of a respective chatbot of the plurality of chatbots, wherein the utterance is routed based at least in-part on:
      calculating, using a first model, a plurality of system intent confidence scores for the set of system intents,
      calculating, using a second model, a plurality of chatbot confidence scores for the plurality of chatbots by calculating a chatbot confidence score for each chatbot of the plurality of chatbots, each respective chatbot confidence score of the plurality of chatbot confidence scores indicating a likelihood of the utterance being representative of a task that a respective chatbot of the plurality of chatbots is configured to perform, and
      calculating, using the plurality of chatbots, a plurality of chatbot intent confidence scores for the set of chatbot intents for each respective chatbot of the plurality of chatbots.

2. The method of claim 1, wherein the first model is a machine-learning based predictive model configured to calculate the plurality of system intent confidence scores based on a plurality of inferences.

3. The method of claim 1, wherein the first model is a rules-based model configured to calculate the plurality of system intent confidence scores based on a plurality of rules stored in a data store.

4. The method of claim 1, further comprising:
   determining that each respective system intent confidence score of the plurality of system intent confidence scores fails to satisfy a system intent confidence score threshold for the respective system intent confidence score.

5. The method of claim 1, wherein each respective chatbot of the plurality of chatbots is configured to generate one or more responses to an input utterance based on the set of chatbot intents for the respective chatbot.

6. The method of claim 1, wherein the master bot is configured to generate a response to the utterance based on the set of system intents.

7. The method of claim 1, further comprising:
   generating, using at least one of the master bot and the plurality of chatbots, one or more responses to the utterance; and
   displaying, on a display device, the one or more responses.

8. A system comprising:
   a processing system comprising one or more processors; and
   one or more computer readable storage media storing instructions which, when executed by the processing system, cause the system to perform operations comprising:
      determining that an utterance received from a user while the user is interacting with a chatbot system comprising a master bot and a plurality of chatbots includes an invocation name of a particular chatbot of the plurality of chatbots or does not include the invocation name of the particular chatbot, wherein the master bot is associated with a set of system intents and each chatbot of the plurality of chatbots is associated with a set of chatbot intents;
      in response to determining that the utterance includes the invocation name, routing the utterance to the particular chatbot; and
      in response to determining that the utterance does not include the invocation name, routing the utterance to the master bot or a chatbot intent of the set of chatbots intents of a respective chatbot of the plurality of chatbots, wherein the utterance is routed based at least in-part on:
         calculating, using a first model, a plurality of system intent confidence scores for the set of system intents,
         calculating, using a second model, a plurality of chatbot confidence scores for the plurality of chatbots by calculating a chatbot confidence score for each chatbot of the plurality of chatbots, each respective chatbot confidence score of the plurality of chatbot confidence scores indicating a likelihood of the utterance being representative of a task that a respective chatbot of the plurality of chatbots is configured to perform, and
         calculating, using the plurality of chatbots, a plurality of chatbot intent confidence scores for the set of chatbot intents for each respective chatbot of the plurality of chatbots.

9. The system of claim 8, wherein the first model is a machine-learning based predictive model configured to calculate the plurality of system intent confidence scores based on a plurality of inferences.

10. The system of claim 8, wherein the first model is a rules-based model configured to calculate the plurality of system intent confidence scores based on a plurality of rules stored in a data store.

11. The system of claim 8, further comprising:
determining that each respective system intent confidence score of the plurality of system intent confidence scores fails to satisfy a system intent confidence score threshold for the respective system intent confidence score.

12. The system of claim 8, wherein each respective chatbot of the plurality of chatbots is configured to generate one or more responses to an input utterance based on the set of chatbot intents for the respective chatbot.

13. The system of claim 8, wherein the master bot is configured to generate a response to the utterance based on the set of system intents.

14. The system of claim 8, the operations further comprising:
generating, using at least one of the master bot and the plurality of chatbots, one or more responses to the utterance; and
displaying, on a display device, the one or more responses.

15. One or more non-transitory computer-readable media storing computer-readable instructions that, when executed by a processing system comprising one or more processors, cause a system to perform operations comprising:
determining that an utterance received from a user while the user is interacting with a chatbot system comprising a master bot and a plurality of chatbots includes an invocation name of a particular chatbot of the plurality of chatbots or does not include the invocation name of the particular chatbot, wherein the master bot is associated with a set of system intents and each chatbot of the plurality of chatbots is associated with a set of chatbot intents;
in response to determining that the utterance includes the invocation name, routing the utterance to the particular chatbot; and
in response to determining that the utterance does not include the invocation name, routing the utterance to the master bot or a chatbot intent of the set of chatbots intents of a respective chatbot of the plurality of chatbots, wherein the utterance is routed based at least in-part on:
calculating, using a first model, a plurality of system intent confidence scores for the set of system intents,
calculating, using a second model, a plurality of chatbot confidence scores for the plurality of chatbots by calculating a chatbot confidence score for each chatbot of the plurality of chatbots, each respective chatbot confidence score of the plurality of chatbot confidence scores indicating a likelihood of the utterance being representative of a task that a respective chatbot of the plurality of chatbots is configured to perform, and
calculating, using the plurality of chatbots, a plurality of chatbot intent confidence scores for the set of chatbot intents for each respective chatbot of the plurality of chatbots.

16. The one or more non-transitory computer-readable media of claim 15, wherein the first model is a machine-learning based predictive model configured to calculate the plurality of system intent confidence scores based on a plurality of inferences.

17. The one or more non-transitory computer-readable media of claim 15, wherein the first model is a rules-based model configured to calculate the plurality of system intent confidence scores based on a plurality of rules stored in a data store.

18. The one or more non-transitory computer-readable media of claim 15, further comprising
determining that each respective system intent confidence score of the plurality of system intent confidence scores fails to satisfy a system intent confidence score threshold for the respective system intent confidence score.

19. The one or more non-transitory computer-readable media of claim 15, wherein each respective chatbot of the plurality of chatbots is configured to generate one or more responses to an input utterance based on the set of chatbot intents for the respective chatbot.

20. The one or more non-transitory computer-readable media of claim 15, wherein the master bot is configured to generate a response to the utterance based on the set of system intents.

* * * * *

UNITED STATES PATENT AND TRADEMARK OFFICE
CERTIFICATE OF CORRECTION

| | | |
|---|---|---|
| PATENT NO. | : 12,249,314 B2 | Page 1 of 1 |
| APPLICATION NO. | : 18/136745 | |
| DATED | : March 11, 2025 | |
| INVENTOR(S) | : Vishnoi et al. | |

It is certified that error appears in the above-identified patent and that said Letters Patent is hereby corrected as shown below:

In the Specification

In Column 12, Line 17, delete ""System. Intent"" and insert -- "System.Intent" --, therefor.

In Column 12, Line 28, delete ""System. Intent"" and insert -- "System.Intent" --, therefor.

In Column 20, Line 5, delete "of" and insert -- of. --, therefor.

In Column 20, Line 17, delete "of" and insert -- of. --, therefor.

In Column 23, Line 61, delete "System. Intent" and insert -- System.Intent --, therefor.

In Column 28, Line 38, delete "iPhone)," and insert -- iPhone®), --, therefor.

In Column 28, Line 56, delete "Internet" and insert -- Internetwork --, therefor.

Signed and Sealed this
Third Day of June, 2025

Coke Morgan Stewart
*Acting Director of the United States Patent and Trademark Office*